United States Patent [19]
Marmilic et al.

[11] Patent Number: 5,941,060
[45] Date of Patent: Aug. 24, 1999

[54] GAS TURBINE HAVING SEQUENTIAL COMBUSTION

[75] Inventors: Robert Marmilic, Nussbaumen, Switzerland; Burkhard Schulte-Werning, Munich, Germany

[73] Assignee: Asea Brown Boveri AG, Baden, Switzerland

[21] Appl. No.: 08/938,454

[22] Filed: Sep. 29, 1997

[30] Foreign Application Priority Data

Oct. 10, 1996 [DE] Germany .......................... 196 41 725

[51] Int. Cl.$^6$ ............................................. F02C 7/00
[52] U.S. Cl. ............................................ 60/39.17; 60/722
[58] Field of Search ............... 60/39.04, 39.17, 60/737, 748, 32.36, 722

[56] References Cited

U.S. PATENT DOCUMENTS

| | | |
|---|---|---|
| 2,242,767 | 5/1941 | Traupel . |
| 2,560,207 | 7/1951 | Berggren et al. ...................... 60/748 |
| 2,959,003 | 11/1960 | Carlisle et al. ........................ 60/748 |
| 2,989,843 | 6/1961 | Ferri ..................................... 60/39.17 |
| 4,438,625 | 3/1984 | Rice ..................................... 60/39.17 |
| 5,454,220 | 10/1995 | Althaus et al. . |
| 5,735,126 | 4/1998 | Schulte-Werning . |

FOREIGN PATENT DOCUMENTS

| | | |
|---|---|---|
| 0620362A1 | 10/1994 | European Pat. Off. . |
| 0669500A1 | 8/1995 | European Pat. Off. . |
| 3033770C2 | 4/1981 | Germany . |
| 4330613A1 | 3/1995 | Germany . |
| 19501471A1 | 8/1995 | Germany . |

*Primary Examiner*—Louis J. Casaregola
*Attorney, Agent, or Firm*—Burns, Doane, Swecker & Mathis, L.L.P.

[57] ABSTRACT

In a gas turbine having sequential combustion and two combustion chambers and in each case associated turbines, a secondary guide row (6a–c) formed in an annular transition duct (1) is arranged on the downstream side of the first turbine before entry into the second combustion chamber. A number of blades of this secondary guide row effect an irrotational flow with regard to the mixing elements, which are located in the second combustion chamber and in the flow plane of the blades, which in each case are combined to form an assembly. Due to the irrotational incident flow in the second combustion chamber, the mixing elements produce a uniform separate swirl flow which optimizes the subsequent combustion, designed for self-ignition, with regard to efficiency and pollutant emissions.

10 Claims, 3 Drawing Sheets

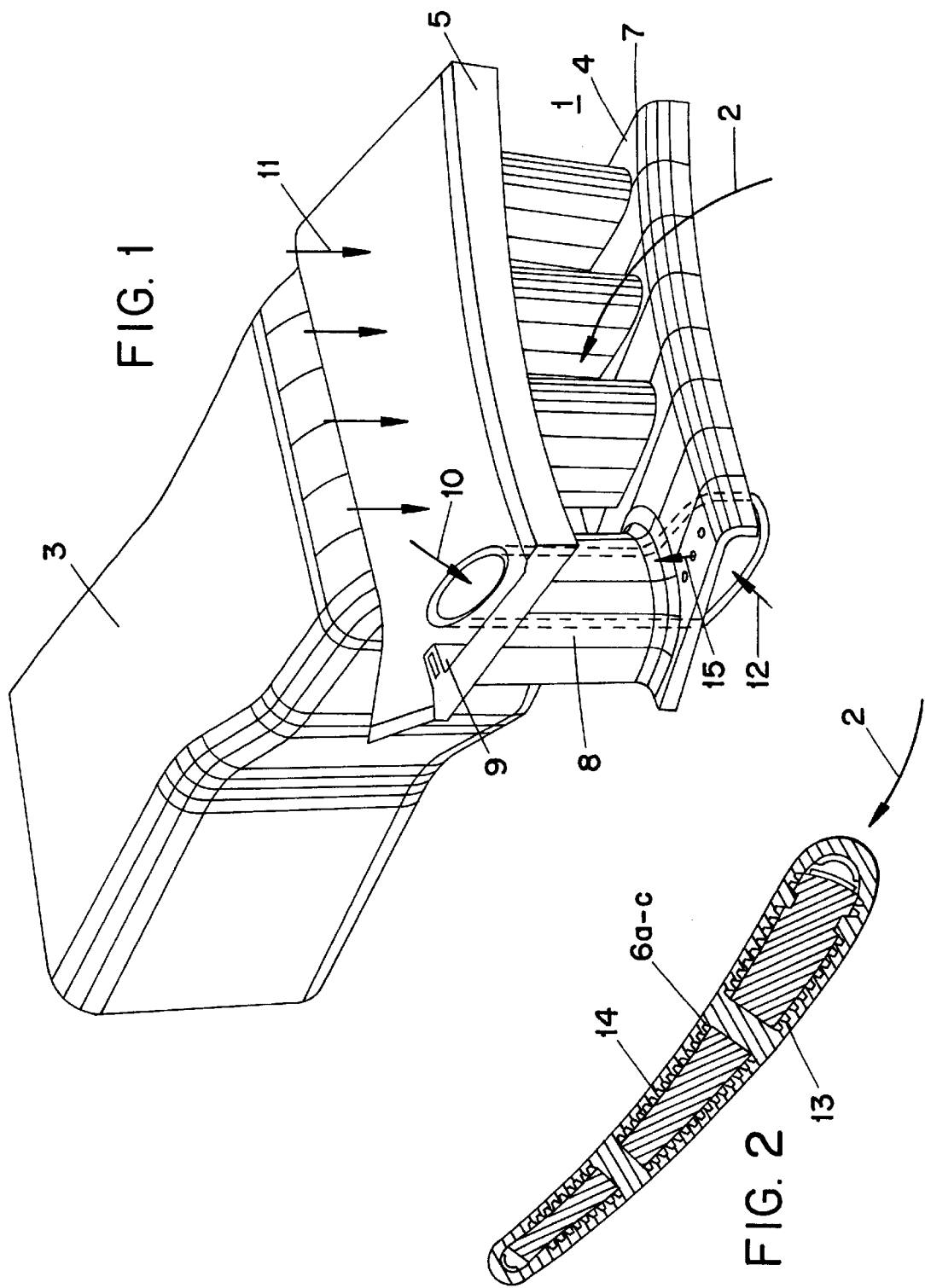

GAS TURBINE HAVING SEQUENTIAL COMBUSTION

BACKGROUND OF THE INVENTION

1. Field of the Invention

The present invention relates to a gas turbine engines of the type having sequential combustion.

2. Discussion of Background

In gas turbines having sequential combustion, as has been disclosed by U.S. Pat. No. 5,577,378, a fuel/air mixture is burned in a first combustion chamber and is then fed to a second combustion stage after an expansion in a first turbine.

The velocity profile of the flow leaving the impeller of the first turbine is intensely swirled in such a way that this flow has to be rectified in order to ensure an optimum incident flow to the following mixing elements belonging to the second combustion chamber, so that as far as possible intimate mixing of these partly expanded hot gases with the fuel fed into the second combustion chamber is achieved, taking as a basis the fact that the second combustion chamber is operated according to a self-ignition process, so that particular importance has to be attached there to optimum mixing for maximizing the efficiency and for minimizing the pollutant emissions.

The quality of the intimate mixing of the fuel injected into the second combustion chamber is in principle dependent the turbulence caused by the mixing elements on the flow of the partly expanded hot gases, i.e. the mixing elements are designed in such a way that they can provide the vortex flow which offers the best preconditions for optimum mixing and combustion. However, this requires the mixing elements to be subjected to an irrotational incident flow over the entire cross section of flow, which an irrotational incident flow, however, is not present downstream of the first turbine for the reasons mentioned.

SUMMARY OF THE INVENTION

Accordingly, one object of the invention, as characterized in the claims in the case of an apparatus of the type mentioned at the beginning, is to provide novel means downstream of the first turbine, which means ensure that the downstream mixing elements are subjected to an irrotational incident flow.

A substantial advantage of the invention may be seen in the fact that these means are designed in such a way that they produce a rectifying effect on the entire flow of the hot gases partly expanded in the first turbine. These means are therefore to be arranged between the turbine impeller and the downstream mixing elements, designed as vortex generators, of the second combustion chamber, so that an irrotational flow results therefrom in accordance with the intended purpose, which an irrotational flow is then admitted to the individual mixing elements in identical quantity and quality.

Since the partly expanded hot gases from the first turbine form a high-velocity flow, and this leads to high thermal loading of the means for forming said irrotational flow, a further substantial advantage of the invention may be seen in the fact that a highly efficient cooling technique is provided which harmonizes with the cooling technique and cooling configuration of the second combustion chamber, as is proposed in the publication U.S. Pat. No. 5,497,611, this publication being an integral part of the present description, but without even having a minimal adverse effect on the gas-turbine cycle with regard to output and efficiency.

Advantageous and expedient developments of the achievement of the object according to the invention are defined in the further dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a section of the annular transition duct downstream of the first turbine and upstream of the second combustion chamber, FIG. 2 shows a guide blade fitted in the transition duct according to FIG. 1 and having appropriate cooling.

DESCRIPTION OF THE PREFERRED EMBODIMENTS

Figure 5:
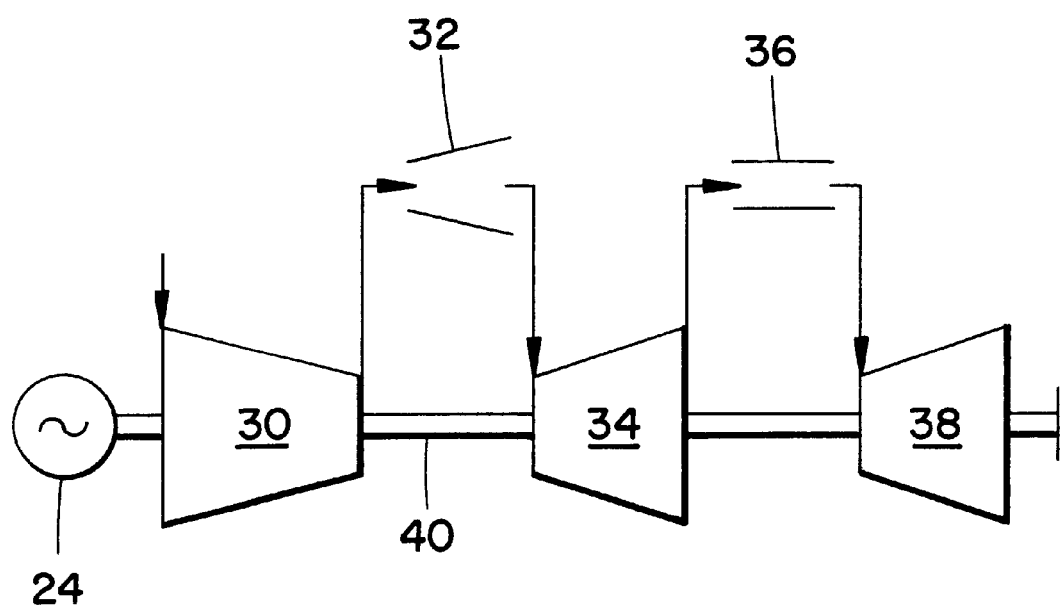
FIG. 5 shows schematically the gas turbine of this invention.

Referring now to the drawings, wherein like reference numerals designate identical or corresponding parts throughout the several views, all elements not required for directly understanding the invention have been omitted, and the direction of flow of the media is indicated by arrows. FIG. 5 shows schematically the gas turbine of this invention, including a compressor 30, a first combustion chamber 32 located downstream of the compressor 30, a first turbine 34 located downstream of the combustion chamber 32, a second combustion chamber 36 located downstream from the first turbine 34, and a second turbine 38 located downstream from the second combustion chamber 36. The turbomachines 30, 34 and 38, in the preferred embodiment, are mounted on a single rotor shaft 40. An electric generator 24 may be driven by the shaft 40. FIG. 1 shows an annular transition duct 1 which is arranged downstream of the turbine 34 and upstream of the second combustion chamber 36. The units of a sequentially fired gas turbine which are not shown here in any more detail are apparent in the publication U.S. Pat. No. 5,577,378. The annular transition duct 1 shown here, through which the partly expanded hot gases 2 from the first turbine flow, subsequently merges into a downstream duct 3 before the mixing elements in the second combustion chamber induce from this flow a vortex flow causally related to the configuration of these mixing elements. The transition duct 1 itself consists of an inner platform 4 and an outer platform 5, which form the continuation of the hot-gas guide from the first turbine to the second combustion chamber. As shown in U.S. Pat. No. 5,577,378, the second combustion chamber is operated with a number of fuel nozzles which are arranged in the peripheral direction of this annular guide and downstream of the mixing elements shown there. Three blades 6a–c are allocated in the present case to each of these fuel nozzles or respectively to the corresponding mixing elements which interact with the fuel nozzle, which blades 6a–c are arranged in the transition duct 1 in a position offset from its front edge 7. The inner and outer platforms 4, 5 are spaced apart and connected to one another in the peripheral direction by a number of struts 8, these struts 8 being located in the plane of the intermediate gap between the individual mixing elements or fuel nozzles respectively in the downstream second combustion chamber, whereby they form individual partial throughflow ducts in the annular transition duct 1, which partial throughflow ducts are in turn subdivided in each case by the three said blades 6a–c. Accordingly, these struts 8 basically do not participate in the smoothing of the swirled flow from the first turbine. On the contrary, they serve to accommodate mechanical connecting elements 9 of the inner and outer supporting structure of the transition duct 1 as well as to pass through air flows 10 which are required to cool, on the one hand, the various thermally loaded units of the gas turbine and, on the other hand, the components of the annular transition duct 1. Here, the cooling of the inner wall of the second combustion chamber, the rotor, and the impeller of the second turbine should be emphasized in particular. The blades 6a–c as well as the other blades of the annular transition duct 1, which form the secondary guide row, are arranged 2–3 chord lengths downstream of the impeller of the first turbine, whereby it is also possible here for this intermediate section to be designed with respect to diffusion or in a diffusion-like manner. By this measure for designing the said intermediate section as a diffusion passage, the requisite number of blades can be considerably reduced and the individual blades 6a–c of the secondary guide row can be designed to be wider in the peripheral direction. Both provisions lead to lower thermal loading of the blades 6a–c both at the front edge 7 and along the two inner walls of the platforms 4, 5 without the rectifying effect being impaired. Thus the cooling-air input turns out to be markedly lower compared with a secondary-guide-blade row belonging to the prior art. The blades 6a–c are designed in such a way that they induce a rectifying effect on the swirl flow. The aim here is at any rate for the mixing elements in the second combustion chamber to be subjected to an irrotational incident flow. The quality of the vortex generation for the fuel injection which then follows is to be produced solely by the configuration of the mixing elements. This is indispensable inasmuch as uniform optimum mixing of the added fuel has to take place so that the combustion initiated by self-ignition in the second combustion chamber is effected uniformly over the entire cross section of flow, that is, takes place without local temperature peaks, which are responsible for causing an increase in the pollutant emissions, in particular the NOx values.

Furthermore, it can be seen from FIG. 1 that the secondary guide row 6a–c and the struts 8 are designed as one component and, as already mentioned several times, are attached between first turbine and second combustion chamber. About 85% of the air mass flow provided by the compressor for cooling the entire center section of the gas turbine first of all convectively cools the walls of the first combustion chamber and then passes into a plenum (not shown in any more detail) upstream of the effusion-cooled second combustion chamber. The remaining 15% of the diverted air mass flow is passed directly from the compressor into a smaller plenum (not shown in any more detail in FIG. 1) belonging to the secondary-guide-row configuration. From there, this air passes the impact cooling 11 of the outer platforms 4, then passes into the radially directed convective ducts of the secondary guide blades 6a–c for the purposes of cross-flow cooling relative to the direction of the partly expanded hot gases 2, and subsequently passes over into an effusion plenum 12 belonging to the inner platform 4, this inner platform 4 likewise being cooled by effusion 15. The air mass flow 10 flowing through the struts 8 then passes likewise into the said effusion plenum 12. Of advantage in this design is the fact that, despite the air mass flow provided for cooling purposes being split up beforehand, recourse can be made to the entire air flow for the effusion cooling in the second combustion chamber.

The difference between the pressure in the first plenum of the annular transition duct 1 and the further effusion plenum 12 is available here as driving pressure gradient for the cooling of the secondary guide row 6a–c. This difference is determined mainly by the cooling of the wall of the first combustion chamber.

FIG. 2 shows the convective cooling, already mentioned, of the blades 6a–c belonging to the secondary guide row, the blades 6a–c having in the interior a row of radially running passages 13 which are arranged side by side and by means of which the cooling air forms a cross flow relative to the direction of the partly expanded hot gases 2 from the first turbine. The blades 6a–c are subdivided into various compartments, the passages 13 being formed from grooves, the fluidic direction of which is effected by inserts 14.

Figure 3:
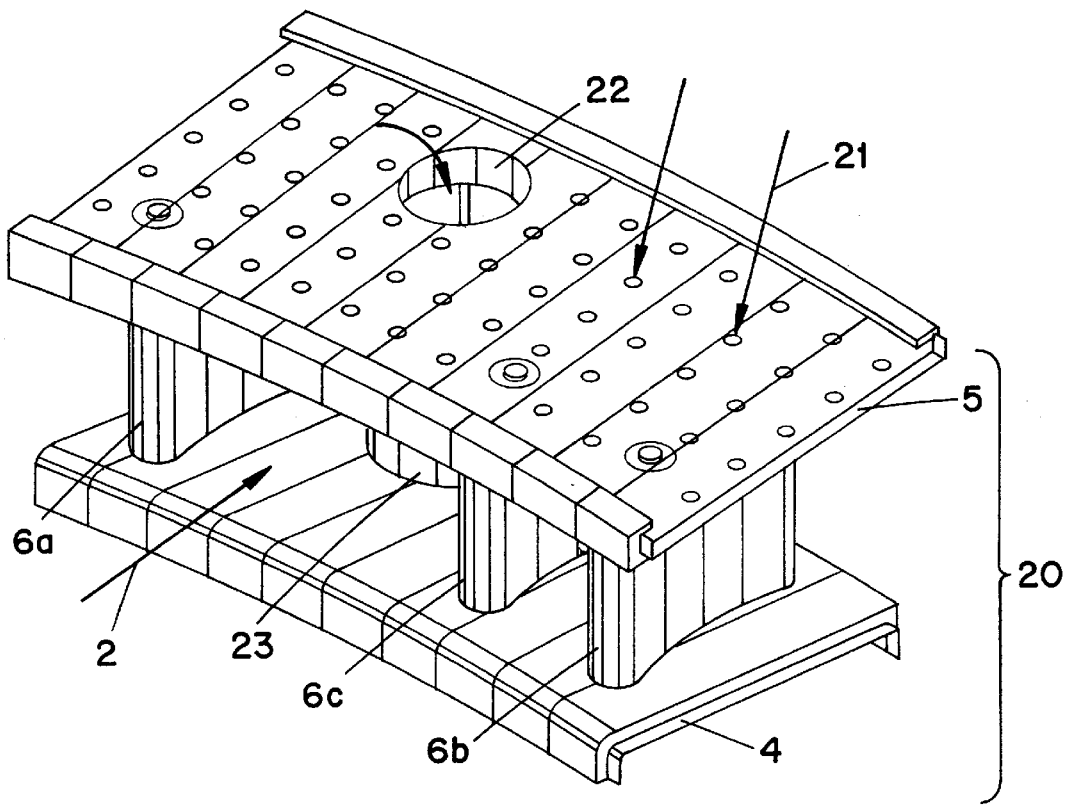
FIG. 3 shows a further embodiment of the annular transition duct.

FIG. 3 shows a further embodiment of a transition duct 20, which is likewise constructed for the purposes of a secondary-guide-row configuration, this transition duct 20 being an autonomous insert part which is inserted intermediately downstream of the first turbine and upstream of the second combustion chamber. This enables the cooling of the second combustion chamber and the secondary guide row shown here to be arranged individually and optimally in such a way that in particular the behavior of the cooling in the entire center section of the gas turbine is improved under part-load conditions specific to gas turbines. This measure gains in importance in particular with regard to a further increase in output of gas turbines having sequential combustion. The cooling air provided for the cooling of the secondary-guide-row part first of all flows likewise into a plenum (not shown in any more detail), and from here it acts as impact cooling 21 on the outer platform 5 in order to then flow via an opening 22 into the radial convective duct of the strut front edge 23, whereby cross-flow cooling results relative to the flow of the partly expanded hot gases 2.

This cooling air then passes into a plenum under the inner platform 4, in a similar manner as already shown in FIG. 1. There, a small portion (about 10–30%) of this air transferred into the inner region passes through the impact cooling of the inner platform 4, and it then passes into the respective radial feeding passages of the three blades 6a–c (shown here) of the secondary guide row, which likewise initiates the said rectifying effects in accordance with the embodiments under FIG. 1. The type of cooling inside the blades 6a–c is apparent from FIG. 4.

Figure 4:
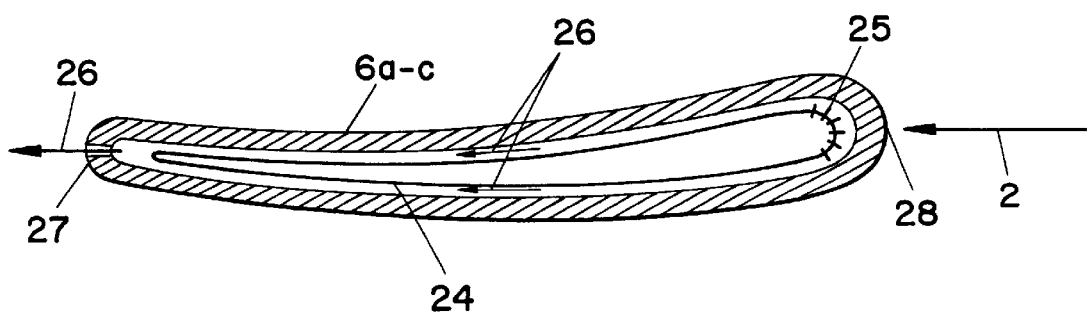
FIG. 4 shows a guide blade fitted in the transition duct according to FIG. 3 and having appropriate cooling.

FIG. 4 shows the specific cooling of the blades 6a–c of the secondary guide row. The cooling air, which according to the description in respect of FIG. 3 passes into the respective radial feeding passages 24 of the blades, first of all cools the respective front edge 28 via an impact plate 25 and is then directed in a convectively cooling manner along the inner wall 26 in a direction of flow parallel to the partly expanded hot gases 2 from the first turbine in order to then be injected into the hot gas at the blade rear edge. The difference between the pressure in the plenum of the center section and the static pressure at the blade rear edge 27 is now available as driving pressure gradient of the cooling for the secondary guide row.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A gas turbine having sequential combustion comprising a compressor unit, a first combustion chamber, a first turbine, a second combustion chamber and a second turbine, the second combustion chamber having mixing elements which induce a vortex flow in interaction with a downstream fuel injection, wherein a secondary guide row acting in a transition duct is arranged intermediately between the first turbine and the second combustion chamber, the blades of which secondary guide row effect an irrotational flow for the admission of gas to the downstream mixing elements.

2. The gas turbine as claimed in claim 1, wherein the transition duct is of annular design, wherein in each case a number of blades positioned between struts form a throughflow duct, and wherein this throughflow duct is oriented to direct gas from the first turbine toward at least one downstream mixing element.

3. The gas turbine as claimed in claim 2, wherein the annular transition duct essentially comprises an inner platform and an outer platform, and wherein the platforms include cooling passages for directing cooling air to flow along the inner and outer platforms.

4. The gas turbine as claimed in claim 1, wherein the duct extends downstream of the secondary guide row.

5. The gas turbine as claimed in claim 1, wherein the blades of the secondary guide row include cooling passages for directing cooling air to cool the blades.

6. A gas turbine comprising: a compressor, a first combustion chamber arranged for receiving compressed air from the compressor to produce a high temperature, high pressure gas, a first turbine driven by the high temperature, high pressure gas, a second combustion chamber arranged to receive gas exiting from the first turbine, and a second turbine driven by gas from the second combustion chamber, the second combustion chamber including a plurality of individual axial transition ducts in an annular arrangement to receive gas from the first turbine at an entrance portion of each duct, the transition duct including at least one mixing means for inducing vortex flow of the gas passing axially through the transition duct, and the entrance portion having a plurality of guide vanes positioned for directing gas from the first turbine to flow axially through the transition duct.

7. The gas turbine according to claim 6, including air passage means for conducting air to cool the guide vanes.

8. The gas turbine according to claim 6 wherein the entrance portion includes inner and outer platforms spaced apart, the guide vanes extending between the inner and outer platforms.

9. The gas turbine according to claim 8, including struts extending between the inner and outer platforms.

10. The gas turbine according to claim 8, including air passage means for cooling the inner and outer platforms.

\* \* \* \* \*